US012552103B2

(12) United States Patent
Lipowitch (10) Patent No.: US 12,552,103 B2
(45) Date of Patent: Feb. 17, 2026

(54) SYSTEM AND METHOD FOR SELECTION OF A PRINT HEAD OF A THREE-DIMENSIONAL PRINTER (71) Applicant: STRATASYS LTD., Rehovot (IL)

(72) Inventor: Shai Lipowitch, Petach Tikva (IL)

(73) Assignee: STRATASYS LTD., Rehovot (IL)

( * ) Notice: Subject to any disclaimer, the term of this patent is extended or adjusted under 35 U.S.C. 154(b) by 459 days.

(21) Appl. No.: 17/618,473

(22) PCT Filed: Jun. 4, 2020

(86) PCT No.: PCT/IL2020/050630
§ 371 (c)(1),
(2) Date: Dec. 12, 2021

(87) PCT Pub. No.: WO2020/250216
PCT Pub. Date: Dec. 17, 2020

(65) Prior Publication Data
US 2022/0297380 A1 Sep. 22, 2022

Related U.S. Application Data (60) Provisional application No. 62/860,570, filed on Jun. 12, 2019.

(51) Int. Cl.
B29C 64/386 (2017.01)
B29C 64/209 (2017.01)
(Continued)

(52) U.S. Cl.
CPC .......... *B29C 64/386* (2017.08); *B29C 64/209* (2017.08); *B33Y 30/00* (2014.12); *B33Y 50/00* (2014.12)

(58) Field of Classification Search
CPC ....... B29C 64/386; B33Y 50/00; B33Y 50/02; G06F 3/1241; G06F 3/1244; G06F 3/1208
See application file for complete search history.

(56) References Cited

U.S. PATENT DOCUMENTS 9,694,544 B2 * 7/2017 Mark ..................... B29C 64/20
9,738,033 B2    8/2017 Kritchman
(Continued)

FOREIGN PATENT DOCUMENTS

WO   WO 2015/178443   11/2015
WO   WO 2015/199019   12/2015
(Continued)

OTHER PUBLICATIONS

International Search Report dated Oct. 5, 2020 for corresponding Application No. PCT/IL2020/050630.
(Continued)

*Primary Examiner* — Seyed Masoud Malekzadeh
(74) *Attorney, Agent, or Firm* — PEARL COHEN ZEDEK LATZER BARATZ LLP (57) ABSTRACT A method for selection of a print head of a three-dimensional (3D) printer includes receiving a model data element having first and second 3D shells, producing an ordered set of slice data elements corresponding to a planar slice of the 3D model, determining an overlapping region of the first and second 3D shells, attributing a property vector value (such as a colorization vector value or a printing material vector value) based on an overlap rule, and selecting a printing head based on the property vector value. A 3D printing system comprises printing heads that can be selected according to the method.

9 Claims, 6 Drawing Sheets (51) Int. Cl.
  *B33Y 30/00*  (2015.01)
  *B33Y 50/00*  (2015.01)

(56) References Cited

U.S. PATENT DOCUMENTS

| | | | |
|---|---|---|---|
| 9,815,268 B2* | 11/2017 | Mark | B29C 64/386 |
| 9,833,948 B2* | 12/2017 | Stava | B33Y 50/00 |
| 10,065,376 B2 | 9/2018 | Hakkaku | |
| 10,703,040 B2 | 7/2020 | Nagahari et al. | |
| 2015/0165691 A1* | 6/2015 | Mark | B29C 64/118 |
| | | | 700/98 |
| 2015/0293722 A1* | 10/2015 | Cudak | G05B 19/4099 |
| | | | 427/209 |
| 2015/0321425 A1* | 11/2015 | Stava | B33Y 30/00 |
| | | | 700/98 |
| 2016/0001504 A1 | 1/2016 | Ikeda et al. | |
| 2016/0311165 A1 | 10/2016 | Mark et al. | |
| 2016/0339643 A1* | 11/2016 | Dikovsky | B29C 64/112 |
| 2017/0001375 A1* | 1/2017 | Melly | B29C 64/386 |
| 2017/0151726 A1 | 6/2017 | Ikeda et al. | |
| 2017/0165919 A1 | 6/2017 | Ohi et al. | |
| 2017/0291373 A1 | 10/2017 | Hara | |
| 2017/0313048 A1 | 11/2017 | Hakkaku et al. | |
| 2018/0117847 A1 | 5/2018 | Ohi | |
| 2018/0117849 A1* | 5/2018 | Brunton | B29C 64/386 |
| 2018/0117856 A1 | 5/2018 | Ochi | |
| 2018/0126664 A1 | 5/2018 | Okawa | |
| 2018/0147838 A1 | 5/2018 | Harayama | |
| 2018/0150263 A1 | 5/2018 | Harayama | |
| 2018/0162056 A1 | 6/2018 | Kaneko et al. | |
| 2018/0169936 A1 | 6/2018 | Harayama | |
| 2018/0178444 A1 | 6/2018 | Hakkaku | |
| 2018/0250883 A1 | 9/2018 | Nagahari et al. | |
| 2018/0304546 A1 | 10/2018 | Hakkaku et al. | |
| 2019/0022756 A1 | 1/2019 | Ohnishi | |
| 2019/0039288 A1* | 2/2019 | Goel | B33Y 50/00 |
| 2019/0043268 A1 | 2/2019 | Harayama et al. | |
| 2020/0307120 A1* | 10/2020 | Hakkaku | B29C 67/00 |
| 2021/0232118 A1* | 7/2021 | Gonzalez Martin | G06T 15/08 |
| 2022/0297380 A1* | 9/2022 | Lipowitch | B29C 64/386 |

FOREIGN PATENT DOCUMENTS

| | | |
|---|---|---|
| WO | WO 2016/163391 | 10/2016 |
| WO | WO 2016/167239 | 10/2016 |
| WO | WO 2016/167240 | 10/2016 |
| WO | WO 2016/190342 | 12/2016 |
| WO | WO 2017/069245 | 4/2017 |
| WO | WO 2017/147412 | 8/2017 |
| WO | WO 2019/043696 | 3/2019 |

OTHER PUBLICATIONS

International Preliminary report on Patentability dated Dec. 23, 2021 for corresponding application No. PCT/IL2020/050630.

* cited by examiner

SYSTEM AND METHOD FOR SELECTION OF A PRINT HEAD OF A THREE-DIMENSIONAL PRINTER

CROSS-REFERENCE TO RELATED APPLICATIONS

This application is a National Phase Application of PCT International Application No. PCT/IL2020/050630, International Filing Date Jun. 4, 2020, claiming the benefit of U.S. Patent Application No. 62/860,570, filed Jun. 12, 2019, which is hereby incorporated by reference.

FIELD OF THE INVENTION

The present invention relates generally to three-dimensional (3D) printers. More specifically, the present invention relates to selection of a printing head of a 3D printer.

BACKGROUND OF THE INVENTION

Systems for 3D printing have become ubiquitous in both industrial and private sectors and are commonly used to produce custom-made 3D objects from a variety of materials and substances.

As known in the art, 3D printers normally receive a data element that may describe or represent a 3D model for printing. The received data element may include a shell, defining the shape or geometry of the 3D model. The shell may include a plurality of shell points, cumulatively defining the shape of the 3D module.

The 3D printer may analyze the received data to produce slices of the 3D model, comprising a plurality of slice points, and print a 3D object, one slice after another, by selecting a print head and applying 3D printing material on a printing grid.

Inkjet-based 3D printing systems encounter similar challenges and obstacles as their 2D predecessors, with additional complexity derived from the 3D volumetric nature of the printed objects.

For example, 3D systems may receive a 3D model for printing that may include a plurality of intricately related 3D sub-models, where each 3D sub-model may be spatially defined by a separate shell. Shells of the 3D sub-models may be characterized by different properties (e.g., different colors, printing material(s), etc.) and may relate to each other spatially such that: a first shell may be included or engulfed within a second shell; a first shell may share a volumetric region with a second shell, to produce a volumetric overlapping region between the shells; and a first shell may be spatially disconnected from a second shell.

SUMMARY OF THE INVENTION

State-of-the-art systems of 3D printing may require manual, intricate configuration of the 3D printing system, to determine spatial relations between different shells, identify volumetric overlapping regions between shells and attributing specific properties to volumetric overlapping regions. Such attribution of properties to volumetric regions of the 3D model may be time consuming, labor intensive and inaccurate.

Accordingly, a system and a method for automatically identifying relations between shells of the 3D model, attributing specific properties to volumetric regions of the 3D model, selecting a 3D print head and applying 3D printing material is desired.

In one aspect, the invention is a method of selecting a print head of a three-dimensional (3D) printer, the method may include: receiving a model data element representing a 3D model that may include a first 3D shell and one or more second 3D shells; producing an ordered set of slice data elements, each slice data element corresponding to a planar slice of the 3D model and may include a plurality of slice points; for at least one slice data element, determining an overlapping region in which one or more slice points belong to the first 3D shell and to at least one of the one or more second 3D shells; for one or more slice points of the overlapping region, attributing a property vector value based on a received overlap rule; and for one or more slice points comprised in the overlapping region, selecting a printing head based on the attributed property vector value.

Embodiments of the invention may include repeating the steps of determining an overlapping region, attributing a property vector value and selecting a printing head for all slice data elements of the ordered set of slice data elements.

The property vector value may be, for example one or more of a colorization vector value and a printing material vector value.

The first 3D shell may be associated with a first property vector value and wherein at least one of the one or more second 3D shells may be associated with a second property vector value.

The overlap rule may be, for example, a selection rule, adapted to select a property vector value from the first property vector value and the second property vector value, and attribute the selected property vector value to one or more slice points in the overlapping region.

Additionally, or alternatively, the overlap rule may be a combination rule, adapted to produce a combined property vector value from the first property vector value and the second property vector value, and attribute the combined property vector value to one or more slice points in the overlapping region.

Additionally, or alternatively, the overlap rule may be a replacement rule, adapted to produce a replacement property vector value that may be distinct from the first property vector value and second property vector value, and attribute the replacement property vector value to one or more slice points in the overlapping region.

Embodiments of the invention may include: receiving a priority list attributing a priority value to one or more 3D shells of the 3D model; and attributing a property vector value to one or more slice points in the overlapping region, based on at least one of: the received overlap rule and the received priority lists.

Attributing a property vector value may include: receiving a priority list attributing a priority value to one or more 3D shells of the 3D model; selecting a 3D shell having lowest priority value on the priority list; for one or more slice points, attributing a property vector value corresponding to a property vector value of the selected 3D shell; selecting a subsequent 3D shell on the priority list; and repeating the steps of selecting a 3D shell, attributing a property vector value and selecting a subsequent 3D shell on the priority list for the entire priority list.

According to some embodiments of the invention, repeating the steps of selecting a 3D shell, attributing a property vector value and selecting a subsequent 3D shell on the priority list to the extent of the priority list may include overriding a first property vector value corresponding to a first 3D shell having a first priority value with a second property vector value corresponding to a second 3D shell having a second, higher priority value.

In another aspect, the invention is a system for selecting a print head of a 3D printer, the system may include a non-transitory memory device, wherein modules of instruction code are stored, and a processor associated with the memory device, and configured to execute the modules of instruction code, wherein, upon execution of said modules of instruction code, the processor may be configured to perform the above method.

In still another aspect, a 3D printing system according to the invention may include a plurality of printing heads each may include one or more printing channels, and the printing system may be configured to select a printing channel according to the above method.

The printing system may be further configured to control one or more hardware elements of the 3D printer to print a 3D object according to the selection of the printing channel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term "set" when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for selection of a printing head and/or printing channel of a 3D printer.

Figure 1:
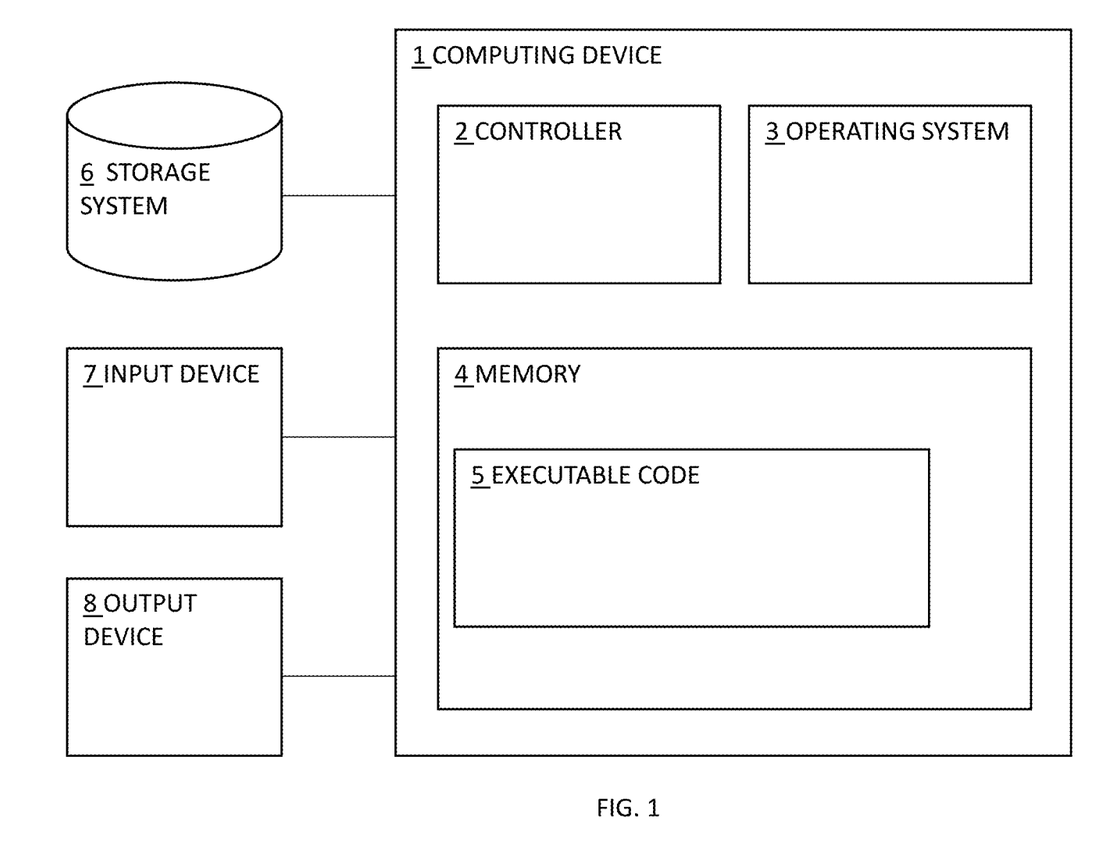
FIG. 1 is a block diagram, depicting a computing device which may be included in a system for selection of a printing head and/or printing channel of a 3D printer, according to some embodiments of the invention.

Reference is now made to FIG. 1, which is a block diagram depicting a computing device, which may be included within an embodiment of a system for selection of a printing head and/or printing channel of a 3D printer, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may select a printing head and/or printing channel of a 3D printer as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
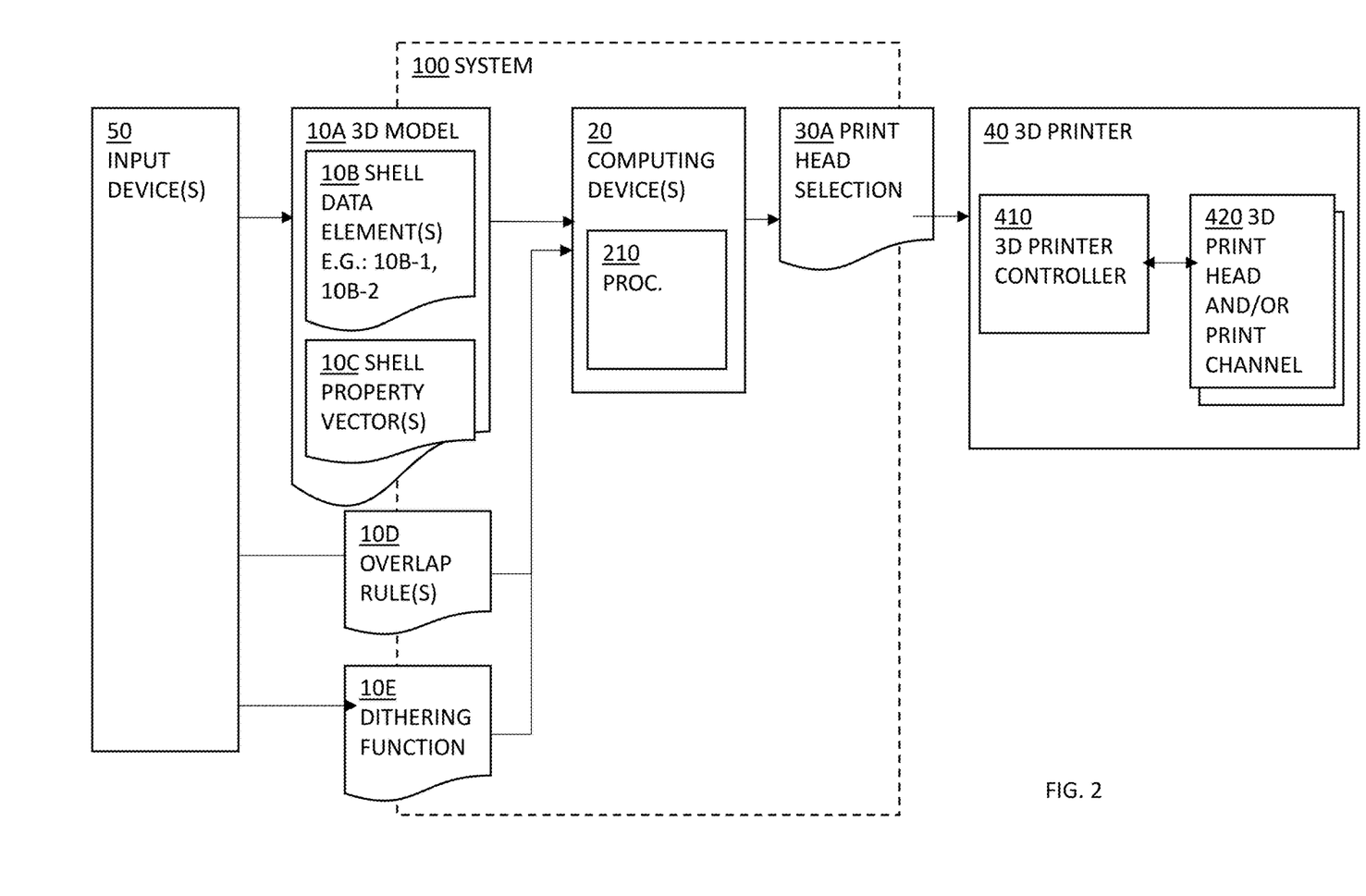
FIG. 2 is a simplified block diagram, depicting a system for selecting a print head and/or printing channel of a 3D printer, according to some embodiments of the invention.

Reference is now made to FIG. 2, which is a simplified block diagram, depicting a system 100 for selecting a print head and/or printing channel of a 3D printer, according to some embodiments. More detailed embodiments of system 100 are elaborated further below.

System 100 may include one or more computing elements or devices 20 (e.g., such as element 1 of FIG. 1), having one or more processors 210 (e.g., such as element 2 of FIG. 1). The one or more processors 210 may be adapted to control and/or execute one or more hardware and/or software modules, for producing a selection 30A of a print head and/or printing channel 420 of a 3D printer or printing machine 40.

As known in the art, print head 420 may be or may include a hardware component that may be adapted to dispense a specific 3D printing material (e.g., 3D printing ink) at a determined quantity and location of a printing grid of 3D printer 40. For example, print head 420 may include a dispenser of a printing material of specific color (e.g., cyan), and may be controlled for example by a controller 410 of 3D printer 40 to dispense the printing material in a specific location in a printing grid.

Selection 30A may be or may include a data element or structure that may associate at least one point in the 3D printer's grid with a selection of a specific print head and/or printing channel 420. For example, selection 30A may be or may include one or more entries in a table, that may associate geometric indices, such as X and Y coordinates of a printing grid and a Z coordinate (e.g., which may normally translate to an index of a slice of a 3D printed model), with a selection of a printing head and/or printing channel. An example for such a table is shown in Table 1:

TABLE 1

| Point | X | Y | Z | C | M | Y | K | W | T |
|---|---|---|---|---|---|---|---|---|---|
| P1 | X1 | Y1 | Slice 1 | 1 | 0 | 0 | 0 | 0 | 0 |
| P2 | X2 | Y2 | Slice 2 | 0 | 1 | 0 | 0 | 0 | 0 |
| P3 | X3 | Y3 | Slice 3 | 0 | 0 | 0 | 1 | 0 | 0 |

In the example of Table 1: Each entry relates to a specific printing point (e.g., P1, P2, P3); X represents the X coordinates on the printing grid of 3D printer 40 (e.g., X1, X2, X3); Y represents the Y coordinate on the printing grid of 3D printer 40 (e.g., Y1, Y2, Y3); Z represents the slice index (e.g., slice 1, slice 2, slice 3); and C, M, Y, K, W and T respectively represent printing heads that dispense Cyan, Magenta, Yellow, Black, White and Transparent printing material.

In this example: a cyan point may be dispensed at coordinates (X1,Y1) of slice 1; a magenta point may be dispensed at coordinates (X2,Y2) of slice 2; and a black point may be dispensed at coordinates (X3,Y3) of slice 3.

As known in the art, the term 3D printing head may refer to a hardware component that may dispense 3D printing material at a predefined position. Implementations of commercially available 3D printing heads may include a single channel (e.g., hold a single type or color of printing material) or a multiple channel (e.g., hold one or more types or colors of printing materials). For the purpose of clarity, in the context of this document, the term 3D printing head may refer to a dispenser with a single channel, printing material or color. It may be appreciated by a person skilled in the art that adaptations may be made so as to relate to printing heads having multiple channels as well.

As shown in FIG. 2, system 100 may be communicatively connected, e.g., via a communication network such as the internet with 3D printer 40. System 100 may produce a print head selection 30A and communicate selection 30A to 3D printer 40 via the communication network. Controller 410 may control one or more hardware elements of 3D printer 40 so as to print a 3D object according to the data included in selection 30A.

Alternatively, system 100 may be included within 3D printer 40. For example, the one or more processors 210 of system 100 may be or may include the same entity as controller 410 and may communicate with hardware elements of 3D printer 40 such as print head 420 to produce a 3D printed object.

As shown in FIG. 2, system 100 may receive one or more input data elements 10, including for example: a model data element 10A; one or more overlap rules 10D; and one or more dithering functions 10E. Model data element may include one or more shell data elements 10B and respective one or more shell property vector values 10C. According to some embodiments, system 100 may receive one or more input data elements 10 from one or more external devices 50 (e.g., such as computing element 1 of FIG. 1). Alternatively, or additionally, system 100 may receive the one or more input data elements 10 via an input device such as element 7 of FIG. 1 (e.g., from a user).

Figure 3A:
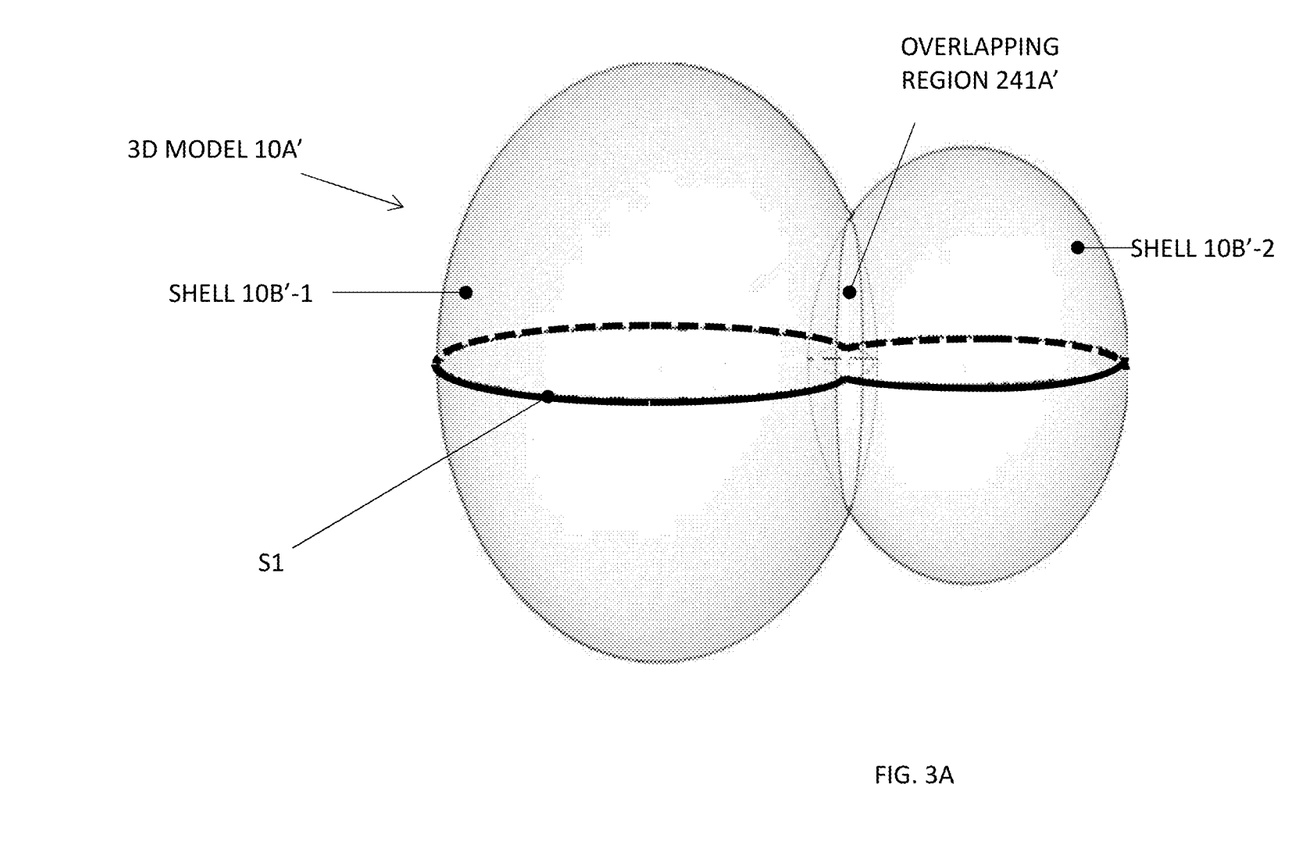
FIG. 3A is a schematic illustration, depicting a 3D model including one or more (e.g., two) sub-models, defined by respective one or more shells and indicating a slice line.

Reference is now made to FIG. 3A which is a schematic diagram depicting an example of a 3D model 10A' or object for 3D printing. 3D model 10A' may include or may be comprised of one or more 3D shells 10B' (e.g., 10B'-1, 10B'-2). In the example depicted in FIG. 3A, 3D model 10A' may include a first 3D shell 10B'-1 and one or more second 3D shells 10B'-2.

According to some embodiments, the one or more 3D shells 10B' may be or may include a water-tight 3D polygonal mesh (e.g., a triangular mesh), where each polygon of the polygonal mesh may include or may be defined by one or more geometrical elements, such as vertices and/or edges of the polygon. The geometrical elements (e.g., vertices) of each polygon may hereby be referred to as shell points (SPs) or a combination of SPs.

For example, a property vector may be a probabilistic colorization vector that may describe or refer to a specific color or composition of colors that may be used by 3D printer 40 to print a 3D object or volumetric region. For example, a shell may be attributed a probabilistic cyan, magenta, yellow and black (CMYK) vector. The term probabilistic may be used herein to indicate that each element of the CMYK vector (e.g., the cyan (C), magenta (M), yellow (Y) and black (K) elements) may be associated with a respective probability value of the respective element to appear in the shell. If, for example, a shell that defines a specific volumetric region is attributed a probabilistic CMYK vector such as [C=50%, M=0%, Y=50%, K=0%], then 3D printer 40 may produce or print the respective volumetric region in a green color (e.g., a mixture of cyan and yellow).

In another example, to assign a brown color to a specific region of a shell of a 3D model, a probabilistic red, green and blue (RGB) colorization vector associated with one or more shell points in that region may have a value of (R=50%, G=50%, B=0%). This value may indicate that the respective shell points may be assigned a red color and a green color in an equal probability. The region may thus be perceived (e.g., by a human viewer) as brown.

In another example, a property vector may be a printing material vector that may describe or refer to a specific material or composition of materials that may be used by 3D printer 40 to print the 3D object. For example, printer 40 may include a plurality of printing heads 420, each holding a different 3D printing material (e.g., M1, M2 and M3), each having specific printing material characteristics (e.g., mechanical properties, price, color, etc.). A shell that may define a 3D object or volumetric region may be attributed a probabilistic printing material vector (e.g., [M1, M2, M3]) that may define respective probability of each material (e.g., M1, M2 and M3) to be used by 3D printer 40 in the printing of the 3D object or volumetric region.

Accordingly, shell data element 10B may include coordinates of a plurality of shell points that may describe the shell's 3D polygonal water-tight mesh and/or one or more property vector values (e.g., a colorization vector value) pertaining to the represented shell 10B', as elaborated in Table 2 below:

TABLE 2

| Shell | Shell points | X coordinate | Y coordinate | Z coordinate | Property vector 1 value | Property vector 2 value |
|---|---|---|---|---|---|---|
| Shell 10B | SP1 | X1 | Y1 | Z1 | PV-1 | PV-2 |
| | SP2 | X2 | Y2 | Z2 | | |
| | SP3 | X3 | Y3 | Z3 | | |

Referring back to FIG. 2, shell data element 10B may be a data structure (e.g., a table) that may represent a respective 3D shell (e.g., elements 10B' of FIG. 3). For example, shell data element 10B may be or may include a table that may include coordinates (e.g., X, Y and Z coordinates) of one or more (e.g., all) shell points pertaining to the shell.

According to some embodiments, one or more shells (e.g., elements 10B' of FIG. 3) may be represented by respective one or more shell data elements 10B. The one or more shell data elements 10B may be attributed one or more property vector values 10C. The one or more property vector values 10C may pertain to respective one or more specific properties or characteristics of the respective one or more shells 10B'.

In the example of Table 2, a shell (e.g., 10B) may be defined by a plurality of shell points (e.g., SP1, SP2, SP3) such as vertices of a water-tight polygonal mesh. Each shell point (e.g., SP1) may be defined by spatial coordinates (e.g., X1, Y1, Z1). The shell (e.g., 10B) may be attributed or assigned one or more property vector values (e.g., PV-1, PV-2), such as colorization vector values or printing material vector values, as elaborated herein.

Model data element 10A may be a data structure (e.g., a table) that may represent the 3D model or object for 3D printing (e.g., element 10A' of FIG. 3). Model data element 10A may include, refer or point to one or more 3D shell data elements 10B that may represent 3D shells 10B' included in 3D model 10A'.

For example, as depicted in FIG. 3A, a 3D model 10A' may include a first 3D shell 10B'-1 and one or more second 3D shell 10B'-2. Respectively, 3D model data element (e.g., element 10A of FIG. 2) may refer to a first 3D shell data element (e.g., a first element 10B of FIG. 2, such as 10B-1) and to one or more second 3D shell data elements (e.g., one or more second elements 10B of FIG. 2, such as 10B-2).

Model data element 10A may be associated with one or more overlap rules 10D. The one or more overlap rules 10D may pertain to a configuration of system 100 and may dictate or define a behavior of system 100 in relation to one or more overlapping regions (e.g., element 241A' of FIG. 3A), as explained herein. An example of a model data element is provided in Table 3, below:

TABLE 3

| Model | Included shells | Overlap rule | overlapping shell |
| --- | --- | --- | --- |
| Model 10A | Shell 10B-1 | OR 10D-1 | Shell 10B-2 |
|  | Shell 10B-2 | OR 10D-1 | Shell 10B-1 |
|  | Shell 10B-2 | OR 10D-2 | Shell 10B-3 |
|  | Shell 10B-3 | OR 10D-2 | Shell 10B-2 |

In the example of Table 3, a model (e.g., model 10A) may include one or more shells (e.g., shell 10B-1, shell 10B-2, shell 10B-3). Shell 10B-1 may overlap shell 10B-2, and system 100 may apply overlap rule (OR) 10D-1 on printing points that may be included in the overlapping region between shell 10B-1 and shell 10B-2. Shell 10B-2 may overlap shell 10B-3, and system 100 may apply overlap rule (OR) 10D-2 on printing points that may be included in the overlapping region between shell 10B-2 and shell 10B-3.

Figure 3B:
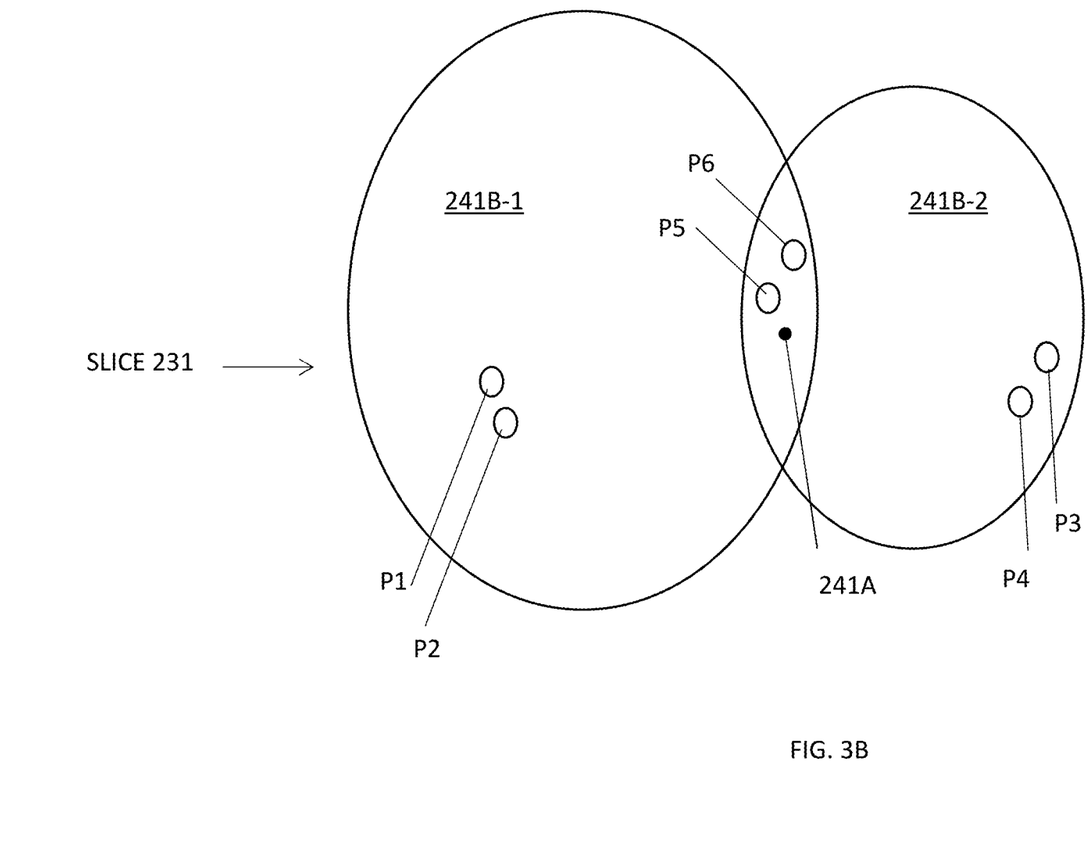
FIG. 3B is a schematic illustration, depicting a slice of the 3D model of FIG. 3A along the slice line.
Figure 4:
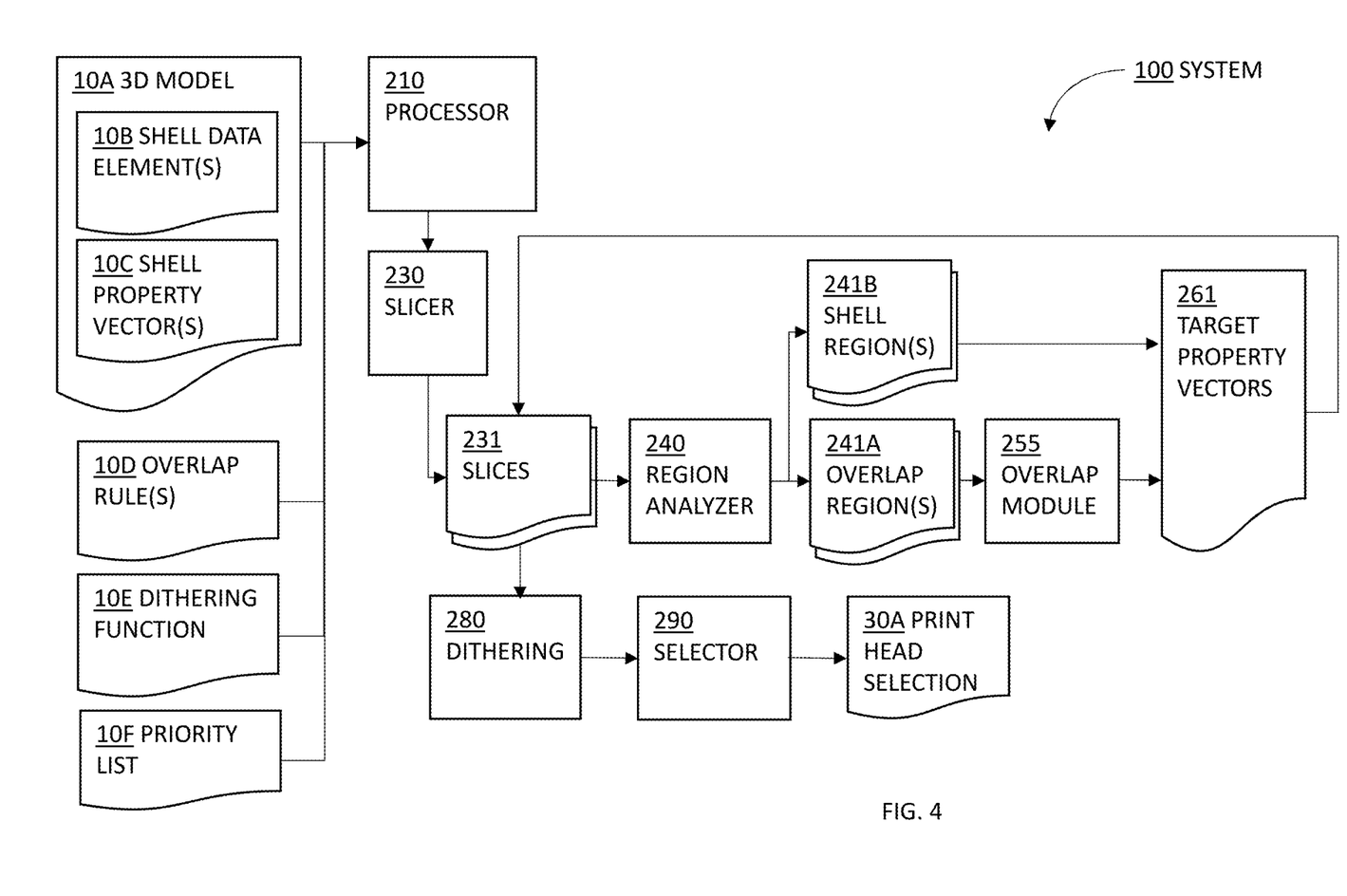
FIG. 4 is a block diagram, depicting a system for selecting a print head and/or printing channel of a 3D printer, according to some embodiments of the invention.

Reference is now made to FIG. 4, which is a block diagram, depicting a system for selecting a print head and/or printing channel 420 of a 3D printer 40, according to some embodiments of the invention. Reference is also made to FIG. 3B, which is a schematic illustration, depicting a slice of the 3D model of FIG. 3A along slice line S1.

System 100 may include a slicer module 230, configured to produce, from model data element 10A an ordered set of slices or slice data elements 231. The plurality or ordered set of slice data elements may be or may include data structures that may correspond to respective planar slices of the 3D geometric shape or model 10A' represented by model data element 10A. Slice data elements 231 may include a plurality of slice points.

Additionally, or alternatively, each planar slice of the 3D geometric shape may be represented by a slice data structure 231 that may include data pertaining to a plurality of slice points aligned in a printing grid of the 3D printer. For example, slice data elements 231 may be or may include a table, that may associate each slice point within the slice with one or more data elements such as: coordinates of the slice point within the printing grid; and one or more property vector values corresponding to the slice point, as shown in the example of Table 4 below:

TABLE 4

| Slice print point | Coordinates within slice | Property vector 1 value | Property vector 2 value |
| --- | --- | --- | --- |
| P1 | (X1, Y1) | PV1-A | PV2-A |
| P2 | (X2, Y2) | PV1-B | PV2-B |

In the example of Table 4, a slice data element may be a data structure that may associate: a first point (e.g., P1) with a first set of coordinates (e.g., X1, Y1), a first value (PV1-A) for a first property vector (such as a colorization vector) and a first value (PV2-A) for a second property vector (such as a printing material vector); and a second point (e.g., P2) with a second set of coordinates (e.g., X2, Y2), a second value (PV1-B) for the first property vector (e.g., the colorization vector) and a second value (PV2-B) for the second property vector (e.g., the printing material vector).

According to some embodiments of the invention, system 100 may include a region analyzer module 240. Region analyzer 240 may be configured analyze one or more (e.g., all) slice elements and determine or identify one or more overlapping regions. The term overlapping may be used in this context to refer to regions in which one or more slice points belong to a first 3D shell and to at least one second 3D shell. Region analyzer 240 may subsequently produce one or more region data elements 241 (e.g., overlap regions 241A and/or shell regions 241B) based on the analysis.

For example, referring back to the example depicted in FIG. 3A and FIG. 3B, 3D model 10A' may include two shells (e.g., 10B'-1 and 10B'-2), defining two intersecting spheres, having an overlapping volumetric region 241A'. Subsequently, a slice of 3D model 10A' at the marked slice line S1 may produce a slice data element 231 as depicted in FIG. 3B, having: a first shell region 241B-1 belonging to or corresponding to first shell 10B'-1; a second shell region 241B-2 belonging to or corresponding to second shell 10B'-2; and a third, overlap region 241A belonging to or corresponding to both first shell 10B'-1 and second shell 10B'-2.

According to some embodiments of the invention, system 100 may be configured to determine a print head selection 30A separately and/or differently for different such regions, according to one or more overlap rules, as elaborated herein.

Pertaining to the example of FIG. 3B, region analyzer 240 may produce a first shell region data element 241B (e.g., 241B-1) pertaining to first shell 10B'-1, a second shell region data element 241B (e.g., 241B-2) pertaining to second shell 10B'-2 and a third, overlap region data element 241A belonging to or pertaining to both first shell 10B'-1 and second shell 10B'-2.

According to some embodiments of the invention, shell region data elements (e.g., 241B-1, 241B-2) and overlap region data elements (e.g., 241A) may be or may include a data structure (e.g., a table) that may include or may refer to respective subsets of slice printing points that may be included in a respective slice data element 231. Shell region data elements 241B may associate between specific slice print points of a specific shell region and shells they belong to and/or respective attributed property vector values. Overlap region data elements 241A may associate between specific slice print points of a specific overlap region and shells they belong to, and may also include a reference to an overlap rule 10D. Overlap rule 10D may be applied, as elaborated herein to arbitrate or determine a value of one or more priority vectors for print points that may be included in the overlapping region (e.g., when values of priority vectors of overlapping shells are in contradiction).

Pertaining to the example of FIG. 3B, Table 5A may represent a content of shell region data element 241B-1, Table 5B may represent a content of shell region data element 241B-2 and Table 5C may represent a content of overlap region data element 241A:

TABLE 5A

| Shell region 241B-1 | Coordinates within slice | Property vector 1 value |
|---|---|---|
| P1 | (X1, Y1) | PV1-A |
| P2 | (X2, Y2) | PV1-A |

TABLE 5B

| Shell region 241B-2 | Coordinates within slice | Property vector 1 value |
|---|---|---|
| P3 | (X3, Y3) | PV1-B |
| P4 | (X4, Y4) | PV1-B |

TABLE 5C

| Region 241A | Coordinates within slice | Overlapping shell regions | Overlap rule 10D |
|---|---|---|---|
| P5 | (X5, Y5) | 241B-1, 241B-2 | OR-1 |
| P6 | (X6, Y6) | | |

According to some embodiments of the invention, system 100 may include an overlap module 255, configured to attribute or assign a target property vector value 261 to one or more slice points of an overlapping region 241A, based on a received overlap rule 10D.

Pertaining to the example of overlap region data element 241A brought in Table 5C, overlap module 255 may apply overlap rule 10D to arbitrate or determine a value of one or more target priority vectors 261 for print points that may be included in the overlapping region (e.g., points P5, P6).

As shown in FIG. 4, system 100 may, for example attribute the determined values of the one or more target priority vectors 261 to print points that may be included in the overlapping region (e.g., points P5, P6) by updating respective entries in respective slice data elements 231, as elaborated in Table 4.

As elaborated herein, overlap module 255 may subsequently assign or attribute a first target property vector value 261 (e.g., a first color value or color property vector) to region 241B-1 print point P5 and a second target property vector 261 value (e.g., a second color value or color property vector) to region 241B-1 print point P5 based on one or more of: overlap rule 10D OR-1; property vector value PV1-A of shell region 241B-1; and property vector value PV1-B of shell region 241B-2.

System 100 may subsequently produce or determine a selection 30A of a printing head and/or printing channel 420 of 3D printer 40 based on the attributed target property vector value 261, as elaborated herein.

System 100 may repeat, for each slice data element of the ordered set of slice data elements the: (a) identification or determination of overlapping regions; (b) attribution of target property vector value values; and (c) subsequent selection of printing heads and/or printing channels, so as to produce or determine one or more print head selections 30A for one or more (e.g., all) print points in the printed 3D object.

According to some embodiments of the invention, a first 3D shell 10B' (and respective shell data element 10B) may be associated with a first property vector 10C value (e.g., a first color) and at least one second, overlapping 3D shell 10B' (and respective shell data element 10B) may be associated with a second property vector 10C value that may be different from or contradict first property vector 10C value (e.g., a second color). As elaborated herein, system 100 may utilize one or more overlap rules 10D to arbitrate between the different property vector 10C values.

Additionally, or alternatively, overlap rule 10D may be a selection rule, adapted to select a property vector value from a first property vector 10C value and a second property vector 10C value, and attribute the selected property vector value as a target property vector value 261 to one or more slice points in the overlapping region.

For example, assume that: property vector 10C is a probabilistic printing material vector as explained herein; first property vector 10C value includes a first composition of 3D printing materials that have a first level of a specific property, such as a first level of structural rigidity; and second property vector 10C value includes a second composition of 3D printing materials that have a second level of the specific property such as a second, lower level of structural rigidity.

Selection rule 10D may dictate, for example, that in overlap regions 241A, where printing material property vector 10C values of overlapping shells contradict one another, a property vector 10C value associated with the first level of the specific property (e.g., the higher level of structural rigidity) should be selected, and attributed as a target property vector 261 value to print points of overlap region 241A.

Alternatively, or additionally, selection rule 10D may dictate that in overlap regions 241A, where printing material property vector 10C values of overlapping shells contradict one another, a mixture of a first property vector 10C value (e.g., a higher level of structural rigidity) and a second property vector 10C value (e.g., a lower level of structural rigidity) may attributed as a target property vector 261 value to print points of overlap region 241A.

Additionally, selection rule 10D may dictate that in overlap regions 241A, where printing material property vector 10C values of overlapping shells contradict one another, a first property vector 10C value and second property vector 10C value may attributed as a target property vector 261 values to print points of overlap region 241A in a predefined probability ratio. For example, first property vector 10C value (e.g., a higher level of structural rigidity) may be attributed in a probability of 80%, and second property vector 10C value (e.g., a lower level of structural rigidity) may be attributed in a probability of 20%.

Alternatively, or additionally, selection rule 10D may be a combination rule, adapted to produce a combined property vector value from a first property vector 10C value (e.g., associated with a first shell data element 10B) and a second property vector 10C value (e.g., associated with a second shell data element 10B), and attribute the combined property vector value as a target property vector 261 value to one or more slice points in the overlapping region 241A.

For example, assume that: property vector 10C is a probabilistic cyan, magenta, yellow, black and white (CMYKW) colorization vector as explained herein; first property vector 10C value includes a first combination of CMYKW component values (e.g., [C=0%, M=0%, Y=0%, K=100%, W=0%]=black); and second property vector 10C value includes a second combination of CMYK component values (e.g., [C=0%, M=0%, Y=0%, K=0%, W=100%]=white).

Combination rule 10D may dictate, for example, that in overlap region 241A, where printing material property vector 10C values of overlapping shells contradict one another (e.g., black vs. white), a combination of the first property vector 10C value and the second property vector 10C value should be produced, resulting for example in a gradient transition of color (e.g., from black to white) through overlap region 241A.

Alternatively, or additionally, combination rule 10D may dictate that the combination of the first property vector 10C value and the second property vector 10C value may result in a mixed color (e.g., [C=0%, M=0%, Y=0%, K=50%, W=50%]=grey) in overlap region 241A.

Alternatively, or additionally, overlap rule 10D may be a replacement rule, adapted to produce a replacement property vector value that may be distinct from the first property vector 10C value and the second property vector 10C value, and attribute the replacement property vector value as a target property vector 261 value to one or more slice points in the overlapping region 241A.

Pertaining to the same example, replacement rule 10D may dictate that slice points in the overlapping region 241A should be attributed a target colorization property vector 261 (e.g., [C=0%, M=0%, Y=100%, K=0%, W=0%]=yellow) that may be distinct from both first property vector 10C value (e.g., black) and second property vector 10C value (e.g., white).

According to some embodiments of the invention, system 100 may receive a priority list 10F that may attribute a priority value to one or more (e.g., all) 3D shells 10B of 3D model 10A. For example, system 100 may receive priority list 10F from a user (e.g., a human administrator or a computer aided design (CAD) software tool), via input element 7 of FIG. 1 and/or via an external input device (e.g., element 50 of FIG. 2).

Alternatively, or additionally, system 100 may receive priority list 10F as part of 3D model 10A data element. For example, shell data element 10B may include a priority entry as elaborated in the example of Table 6 below:

TABLE 6

| Shell | Shell points | X coordinate | Y coordinate | Z coordinate | Property vector 1 value | Priority |
|---|---|---|---|---|---|---|
| Shell 10B | SP1 | X1 | Y1 | Z1 | PV-1 | N |
| | SP2 | X2 | Y2 | Z2 | | |
| | SP3 | X3 | Y3 | Z3 | | |

As shown in Table 6, Shell 10B may be attributed a priority (e.g., a number marked by 'N'). Other entries in the example of Table 6 are substantially equal to respective entries in Table 2 and will not be repeated here for the purpose of clarity.

Embodiments of the invention may attribute a target property vector 261 value to one or more slice points in overlapping region 241A based on at least one of: the received overlap rule 10D and the received priority list.

It may be appreciated by a person skilled in the art of 3D printing that attributing a target property vector 261 value to slice points of overlapping regions 241A based on priority may provide an improvement over state-of-the-art 3D printing systems. For example, as known in the art, commercially available 3D printers may require intricate manual configuration of the 3D printing system, to determine spatial relations between different shells, identify volumetric overlapping regions between shells and attributing specific properties to volumetric overlapping regions.

In contrast, embodiments of the invention may facilitate setting of: a value of target property vector values 261 that may be attributed to slice points (as explained herein in relation to application of overlap rules); and an order in which slice points corresponding to each shell may be attributed target property vector values 261, as may be dictated by each shell's priority in the priority list.

For example, embodiments of the invention may: (a) select the 3D shell of the lowest priority on the priority list; (b) for one or more (e.g., all) slice points, attribute a property target vector value corresponding to a property vector value of the selected 3D shell; (c) select a subsequent 3D shell on the priority list (e.g., in the order of priority); and (d) repeat steps (b) and (c) to the extent of the priority list.

Repeating steps (b) and (c) to the extent of the priority list may include overriding a first target property vector value 261 corresponding to a first 3D shell 10B having a first priority 10F with a second target property vector value 261 corresponding to a second 3D shell 10B having a second, higher priority 10F. Therefore, the order as dictated by priority list 10F may be set so as to attribute specific target property vector values 261 to printing points included in overlapping volumetric regions.

Such ordering may, for example, facilitate automatic 3D printing of objects that have a hierarchical structure, where a first, large object may be defined by a first, exterior shell 10B and may include or encompass a second, smaller object, defined by a second, interior shell 10B. First, exterior shell 10B may be attributed a first priority and second, interior shell 10B may be attributed a send, higher priority.

According to the order as dictated by steps (a) through (d) above, at a first stage slice points that may be included in the exterior shell 10B (and in the encompassed interior shell) may be attributed a property target vector value 261 corresponding to a property vector value of the exterior 3D shell 10B. At a second stage, slice points that may be included in the encompassed interior shell may be attributed a property target vector value that may correspond to a property vector value of the interior 3D shell 10B, overriding the previous property target vector value 261.

System 100 may include a dithering module 280 configured to apply a dithering algorithm on one or more target property vectors 261 and obtain therefrom a value pertaining to a droplet of printing material. For example, in an embodiment where target property vector 261 is a probabilistic CMYKW colorization vector, the droplet color value may be, for example: cyan, magenta, yellow, black and white.

Dithering module 280 may receive data pertaining to a slice data element 231 (e.g., as elaborated in the example of Table 4), including a plurality of printing points and a respective plurality of target colorization vectors 261. Dithering module 280 may apply one or more dithering algorithms on the values of target colorization vectors 261 of slice data element 231, so as to produce a value of a droplet of printing material (e.g., a color value) for one or more (e.g., all) printing points included in slice data element 231.

For example, in an embodiment where target property vector 261 is a probabilistic CMYKW colorization vector, a dithering module 280 may produce a droplet color value that may correspond to a maximal component of attributed target colorization property vector 261. For example, if components of a target property colorization vector 261 attributed to a specific colorization point are [C=10%; M=20%; Y=0%; K=34%; W=36%] then the produced droplet color value may be 'white'.

In a second example, dithering module 280 may add noise (e.g., blue noise, as commonly referred to in the art) to components of the attributed target property vector 261. Pertaining to the same example, attributed target property colorization vector 261 [C=10%; M=20%; Y=0%; K=34%; W=36%] may be changed due to the added noise and may become [C=9%; M=21%; Y=1%; K=35%; W=34%]. Dithering module 280 may thus produce a droplet color value that is 'black'.

The dithering algorithm may include, for example one or more dithering algorithms as known in the art, including for example: thresholding, random dithering, patterning, ordered dithering (e.g. halftone dithering, Bayer matrix, Blue noise matrix), error diffusion dithering (e.g. Floyd-Steinberg dithering, Jarvis dithering, Stucki dithering, Burks dithering, Sierra dithering, Atkinson dithering, Gradient-based error diffusion dithering) and any combination thereof.

System 100 may further include a selector module 290, configured to emit a print head and/or printing channel selection 30A, as explained in relation to table 1.

According to some embodiments of the invention, selector module 290 may select a printing head and/or printing channel 420 based on the attributed target property vector 261. For example, in an embodiment where target property vector 261 is a probabilistic CMYKW colorization vector: dithering module 280 may be configured to select a droplet color value as elaborated herein; and selector module 290 may select a 3D print head and/or printing channel 420 that may correspond to the droplet color value selected by dithering module 280 (e.g., a first print head for a cyan droplet, a second print head for a yellow droplet, etc.).

Figure 5:
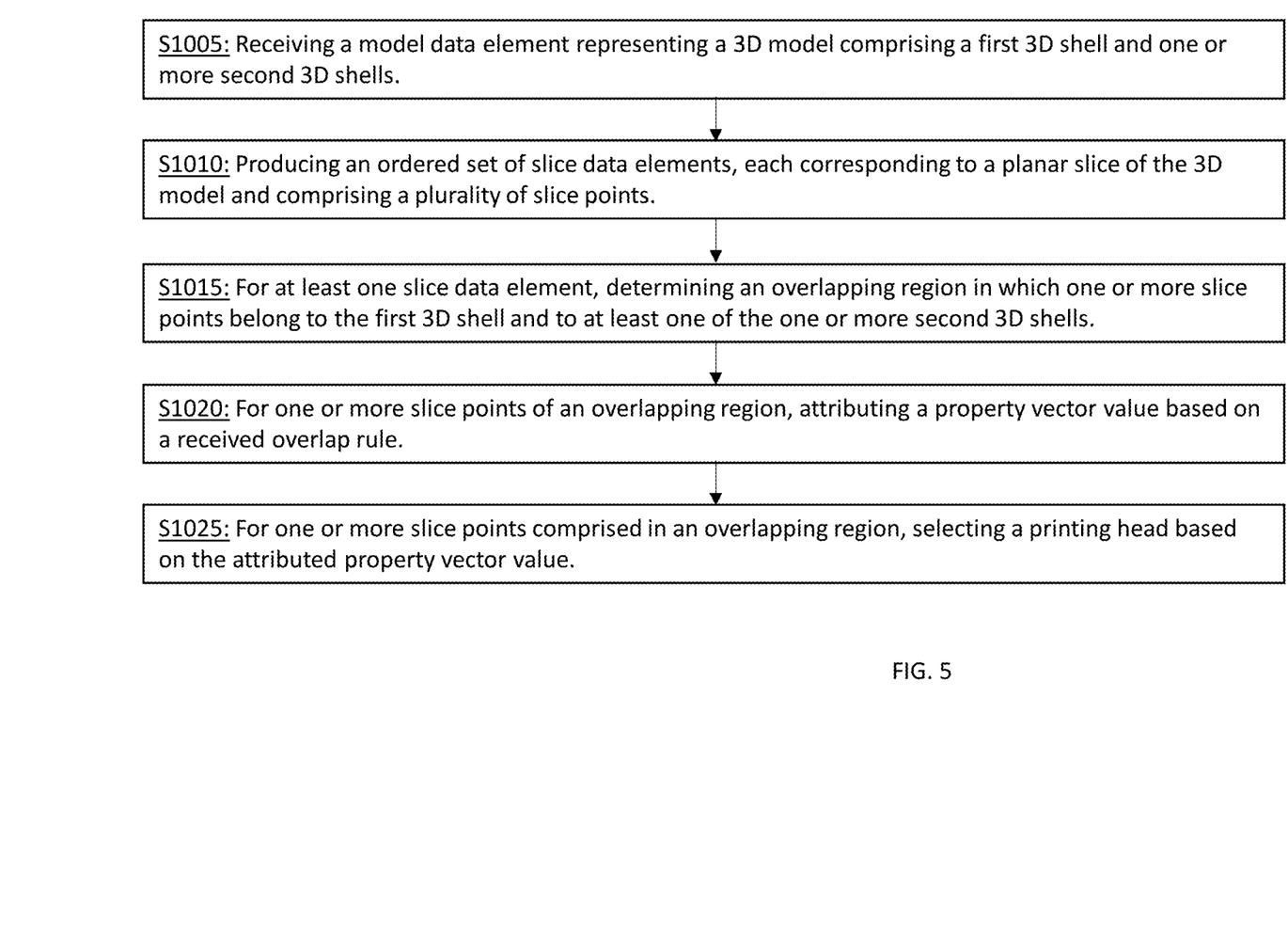
FIG. 5 is a flow diagram, depicting a method for selecting a print head and/or printing channel of a 3D printer, according to some embodiments of the invention.

Reference is now made to FIG. 5, which is a flow diagram, depicting a method for selecting a print head and/or printing channel 420 of a 3D printer 40 buy one or more processors, according to some embodiments of the invention.

As shown in step S1005, the one or more processors (e.g., element 1 of FIG. 1) may receive a model data element (e.g., element 10A of FIG. 2) representing a 3D model (e.g., element 10A' of FIG. 3A). 3D model 10A' may include a first 3D shell (e.g., element 10B'-1 of FIG. 3A) and one or more second 3D shells (e.g., one or more elements 10B'-2 of FIG. 3A).

As shown in step S1010, the one or more processors 1 may produce an ordered set of slice data elements (e.g., element 231 of FIG. 4), each corresponding to a planar slice of the 3D model and comprising a plurality of slice points (e.g., elements P1-P6 of FIG. 3B).

As shown in step S1015, the one or more processors 1 may, for at least one slice data element 231, determine an overlapping region (e.g., element 241A of FIG. 3B and FIG. 4) in which one or more slice points belong to the first 3D shell 10B'-1 and to at least one of the one or more second 3D shells 10B'-2;

As shown in step S1020, the one or more processors 1 may, for one or more slice points of overlapping region 241A, attribute a property vector value (e.g., target property vector 261 of FIG. 4), based on a received overlap rule (e.g., element 10D of FIG. 4) as elaborated herein in relation to FIG. 4.

As shown in step S1025, the one or more processors 1 may, for one or more slice points (e.g., elements P5, P6) comprised in overlapping region 241A, select a printing head and/or printing channel, based on the attributed property vector value, as elaborated herein in relation to FIG. 4.

Embodiments of the invention may include a practical application for selecting one or more print heads and/or printing channels of a 3D printing machine or printer.

As elaborated herein, state-of-the-art systems of 3D printing may require manual, intricate configuration of the 3D printing system, to determine spatial relations between different shells, identify volumetric overlapping regions between shells and attributing specific properties to volumetric overlapping regions. As known to persons skilled in the art, such attribution of properties to volumetric regions of the 3D model may be time consuming, labor intensive and inaccurate. As elaborated herein, embodiments of the invention may provide an improvement over state-of-the-art systems of 3D printing by facilitating automated, rule-based attribution of properties (e.g., colorization properties, printing material properties and the like) to specific printing points of the printed 3D object.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of selecting a printing head of a three-dimensional (3D) printer, the method comprising:
   a. receiving a 3D model comprising a first 3D shell and one or more second 3D shells, wherein each of said 3D shells comprises coordinates of a plurality of shell points that describe a 3D polygonal water-tight mesh, and wherein said first 3D shell and said one or more second 3D shells share an overlapping volumetric region;
   b. receiving a priority list attributing a priority value to said first 3D shell and said one or more second 3D shells;
   c. producing an ordered set of slices of said 3D model, each slice comprising a plurality of slice points defined by X, Y, Z coordinates;
   d. for at least one slice, determining an overlapping region in which one or more slice points belong to the first 3D shell and to said at least one or more second 3D shells wherein the first 3D shell is associated with a first property vector value, and wherein at least one of the one or more second 3D shells is associated with a second property vector value;
   e. attributing a target property vector value to said one or more slice points in the overlapping region based on said received priority list and also based on a received overlap rule wherein the overlap rule comprises at least one condition for the first property vector value and the second property vector value;
   f. selecting a printing head based on the attributed target property vector value; and
   g. dispensing a printing material from said selected printing head.

2. The method of claim 1, further comprising repeating steps (c) to (g) for all slices of the ordered set of slices.

3. The method according to claim 1, wherein said property vector value is a colorization vector value.

4. The method according to claim 1, wherein said property vector value is a printing material vector value.

5. The method according to claim 1, wherein the overlap rule is a selection rule, adapted to select a property vector value from the first property vector value and the second property vector value, and attribute the selected property vector value to one or more slice points in the overlapping region.

6. The method according to claim 1, wherein the overlap rule is a combination rule, adapted to produce a combined property vector value from the first property vector value and the second property vector value, and attribute the combined property vector value to one or more slice points in the overlapping region.

7. The method according to claim 1, wherein the overlap rule is a replacement rule, adapted to produce a replacement property vector value that is distinct from the first property vector value and second property vector value, and attribute the replacement property vector value to one or more slice points in the overlapping region.

8. The method according to claim 1, wherein attributing a property vector value comprises:
 i. selecting a 3D shell having lowest priority value on the priority list;
 ii. for one or more slice points, attributing a property vector value corresponding to a property vector value of the selected 3D shell;
 iii. selecting a subsequent 3D shell on the priority list; and
 iv. repeating steps (i) through (iv) for the entire priority list.

9. The method according to claim 8, wherein repeating steps (i) through (iii) to the extent of the priority list comprises overriding a first property vector value corresponding to a first 3D shell having a first priority value with a second property vector value corresponding to a second 3D shell having a second, higher priority value.

* * * * *